(12) United States Patent
Lennartson

(10) Patent No.: US 8,477,646 B2
(45) Date of Patent: Jul. 2, 2013

(54) METHOD FOR DETERMINING POSSIBLE LOCALLY SWITCHED TRAFFIC WITHIN A CELLULAR NETWORK SITE

(75) Inventor: Benny Lennartson, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 357 days.

(21) Appl. No.: 12/936,720

(22) PCT Filed: Apr. 21, 2008

(86) PCT No.: PCT/SE2008/050451
§ 371 (c)(1),
(2), (4) Date: Oct. 7, 2010

(87) PCT Pub. No.: WO2009/131499
PCT Pub. Date: Oct. 29, 2009

(65) Prior Publication Data
US 2011/0026428 A1  Feb. 3, 2011

(51) Int. Cl.
*H04L 12/26* (2006.01)
*G06F 11/00* (2006.01)
*H04W 4/00* (2009.01)

(52) U.S. Cl.
USPC .............................. 370/252; 370/328; 379/82

(58) Field of Classification Search
USPC ...... 370/252–465; 379/82–200; 455/436–509
See application file for complete search history.

(56) References Cited

U.S. PATENT DOCUMENTS

| 5,047,764 A | * | 9/1991 | Andros et al. | 340/7.39 |
| 2003/0002591 A1 | * | 1/2003 | Boneh et al. | 375/295 |
| 2008/0130539 A1 | * | 6/2008 | Lauer et al. | 370/310 |
| 2010/0046429 A1 | * | 2/2010 | Heath et al. | 370/328 |

FOREIGN PATENT DOCUMENTS

| WO | WO 02/03336 A2 | 1/2002 |
| WO | WO 2006/117652 | 11/2006 |
| WO | WO 2006/126923 | 11/2006 |

OTHER PUBLICATIONS

International Search Report, PCT Application No. PCT/SE2008/050451, Mailed Feb. 18, 2009.
Written Opinion of the International Searching Authority, PCT/SE2008/050451, Mailed Feb. 25, 2009.

* cited by examiner

*Primary Examiner* — Afsar M Qureshi
(74) *Attorney, Agent, or Firm* — Myers Bigel Sibley & Sajovec, P.A.

(57) ABSTRACT

The invention relates to a method for determining connected transmissions within a first site of a communications network comprising the steps of: —retrieving (70) at least one transmission characteristic comprising a time parameter of a first number of transmissions over transmission links within at least the first site of the communications network, and determining (72) a second number of transmissions of the first number of transmissions that are connected to each other and form a two way transmission based on comparison of the transmission characteristic of the first number of transmissions.

22 Claims, 9 Drawing Sheets

| Transmission | M1 | M2 | M3 | M4 | M5 |
|---|---|---|---|---|---|
| M1 | ■ | 0,28 | 0.0 | 0,0 | 0.05 |
| M2 | 0,28 | ■ | 0,002 | 0,001 | 0,0 |
| M3 | 0.0 | 0,002 | ■ | 0,0 | 0,32 |
| M4 | 0,0 | 0,001 | 0,0 | ■ | 0.001 |
| M5 | 0,05 | 0.0 | 0,32 | 0.001 | ■ |

FIG. 8

METHOD FOR DETERMINING POSSIBLE LOCALLY SWITCHED TRAFFIC WITHIN A CELLULAR NETWORK SITE

CROSS REFERENCE TO RELATED APPLICATION

This application is a 35 U.S.C. §371 national stage application of PCT International Application No. PCT/SE2008/050451, filed on Apr. 21, 2008, the disclosure and content of which is incorporated by reference herein in its entirety. The above-referenced PCT International Application was published in the English language as International Publication No. WO 2009/131499 A1 on Oct. 29, 2009.

TECHNICAL FIELD

The invention relates to a method for and a control unit in a communications network. In particular, the invention relates to determine traffic within a site of a communications network

BACKGROUND

Today, a feature that often is discussed is the area of switching calls and the like is local switching or local connectivity in communications network. This feature allows calls to be locally switched within a site of a wireless communications networks, such as GSM, WCDMA, LTE or the like. For example, in the GSM the calls are locally switched within a site, in general, three cells, of a Radio Base Station, RBS. This means that the user data of a call is not transferred all the way from a RBS to a Base Station Controller, BSC, and back to the RBS, but rather switched within the site of the RBS. It should here be understood that a site may comprise a number of base stations being located nearby one another providing one cell or a number of cells.

This feature reduces the amount of needed capacity and, consequently, costs for the operator since the speech does not need to be transmitted on the radio interface between the RBS and the BSC, that is, the Abis interface. The Abis interface transports signaling protocols as well as compressed speech.

Local switching of calls may as well be performed within a site of a different network, such as a WCDMA, LTE network or the like, wherein a call is switched within a site of a node B or an evolved node B.

In order to enable the feature of local switching within a site of a base station, such as a RBS, Node-B or the like, of a wireless communications system, additional hardware and software need to be implemented into the base station. Consequently, if there is no or a very small amount of locally switched traffic within a site there is no need to implement these additional components and by determining if no or a very small amount is locally switched transmissions one may save costs by not doing the implementations. To determine if/how much traffic that is possible locally switched traffic within a site, one preferably measures how much traffic stays within the site, that is, are local transmissions.

However, it is very hard to measure how much traffic that is local traffic within a site. One way is to determine that traffic is locally switched by analyzing identity information of a Call Data Records, CDR, from an operator. The CDR contains user information, such as, ID of the caller and the callee, and so on, information that is very sensitive due to user integrity. As the information is very sensitive CDRs are not available or accessible for people and departments planning, building, selling communications networks and it is hard to determine what transmissions over a network that are connected to each other.

SUMMARY

It is an object of embodiments of the invention to provide a method for determining transmissions within a site of a communications network that are connected to each other in an efficient and reliable manner.

In an aspect a method for determining connected transmissions within a first site of a communications network is provided comprising the steps of: retrieving at least one transmission characteristic comprising a time parameter of a first number of transmissions over transmission links within at least the first site of the communications network, and— determining a second number of transmissions of the first number of transmissions that are connected to each other and form a two way transmission based on comparison of the transmission characteristic of the first number of transmissions.

In a second aspect a computer program product arranged when being executed on a control unit of a computer system to perform the method according to the above is provided.

In a third aspect a control unit in an electronic device connected to a memory is provided, wherein the control unit is arranged to retrieve at least one transmission characteristic comprising a time parameter of a first number of transmissions over transmission links within at least a first site of a communications network, and to determine a second number of transmissions of the first number of transmission that are connected to each other and form two way transmissions based on a comparison of the transmission characteristic of the first number of transmissions.

Embodiments disclose ways that are cost efficient, reliable, and/or efficient.

BRIEF DESCRIPTION OF THE DRAWINGS

Embodiments will now be described in more detail in relation to the enclosed drawings, in which:

FIG. 8 shows a matrix of transmissions M1-M5 and the $P_{ABMiMj}$ for each transmission couple.

DETAILED DESCRIPTION OF EMBODIMENTS

Figure 1:
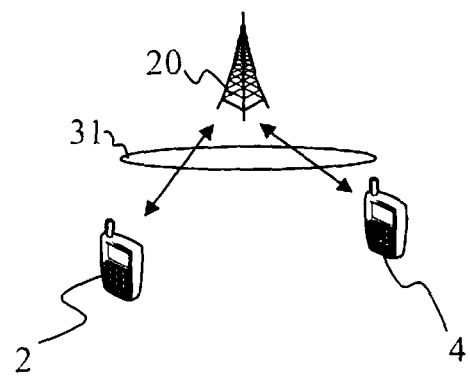
FIG. 1 shows a schematic overview of a transmission between two terminals.

The present invention now will be described more fully with reference to the accompanying drawings, in which embodiments of the invention are disclosed relating to determining amount of locally switched transmissions within a site of a base station. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, a "communication terminal" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

When the communication terminal is configured to communicate over a wireless interface, it is referred to herein as a "wireless communication terminal" or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

The base station may be a radio base station, Node B, evolved Node B, or the like.

As stated above, a site may comprise a cell or a numerous of cells, which is/are being provided by one base station or a numerous of base stations resulting in that local switching may be performed over one site comprising a number of base stations. In these embodiments, the hardware to perform the local switching is located between the locally placed base stations and the control station or incorporated into one for the base stations at the site.

FIG. 1 shows a schematic overview of a transmission between two terminals 2, 4 that is locally switched over a site of a base station 20. The terminals 2,4 may be located in different cells but within the site of the base station. The transmission, for example, a speech call, may be transmitted over a Um Interface 31 without affecting the A-bis interface (not shown). In order to determine if an installation of local switching components enabling local switching is needed/desired/cost efficient it is preferred that one knows the amount of transmissions where local switching would be possible, and especially, as percentage of the total amount of transmissions or the like.

In an embodiment a reliable determination of possible locally switched traffic is achieved wherein one initially determines which transmissions within a site form a two way transmission. A two way transmission is defined as a transmission between two user equipments, such as a call between two user equipments or the like, that is, a first transmission connected to a second transmission forming a communication link between the user equipments. In order to determine that two transmissions constitute a two way transmission at least one or a number of characteristics of each transmission are compared. The characteristics may comprise a time parameter indicating a time during the day a transmission started. This time parameter is herein after denoted as Callstart. The characteristics may further comprise another time parameter indicating when a transmission ended, denoted as Callend, and/or a time parameter called a discontinuous transmission factor indicating the transmission direction over time, that is, if the mobile station or the base station is transmitting or not during a transmission, denoted as DTX. In addition, a fourth parameter may be included into the characteristics of the transmission indicating if the transmission is a terminating or originating transmission, denoted as CallOrigin.

The four characteristics Callstart, CallOrigin, Callend and DTX factor may be retrieved for each transmission from a logging function installed in the system.

By analyzing one or a plurality of these parameters one may determine with a good accuracy if a two way transmission is performed between two terminals within a site of a base station. As an example, if two transmissions start at a similar time, finish at a similar time, and one transmission is an originating transmission and the other transmission is a terminating transmission, then it is very likely that these two transmissions are connected with each other forming a two way transmission. With knowledge about what site a specific transmission is connected to it is possible to determine if two transmissions belonging together form a possible locally switched two way transmission.

One may further or just analyze that DTX factors of the transmissions over the uplinks/downlinks are the "inverse" of each other over time. That the DTX factors are being the inverse of each other means basically that the transmission directions are the opposites of each other, that is, when a first mobile station transmits data, uplink being busy, the second mobile station receives data, uplink being free.

A site is the one RBS hardware or several RBS hardware that are positioned at the same geographical spot. Normally this is in shelter or a room that is close to antennas. The site may serve several cells. A normal configuration is that a site is serving three cells.

Local switching will switch the payload, speech or the like, locally within a site. That is, within a cell or between cells located at the same site. However, signaling for a call, Mobility Management. Call Management, may still be handled by the BSC.

Figure 2:
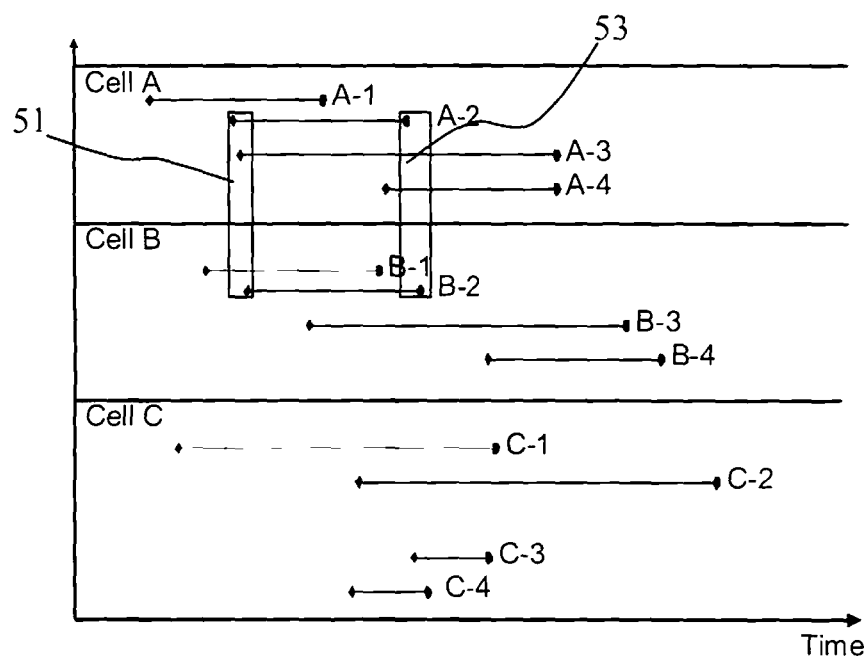
FIG. 2 discloses time information of a number of transmissions within a number of cells, FIG. 3 discloses a schematic curve of the probability that a second transmission is connected to a first transmission based on a similar start time.

FIG. 2 discloses time information of a number of transmissions A-1-A-4, B-1-B-4, C-1-C-4 between different terminals and a base station with cells A, B, C, that is, time information concerning start and end of transmission in a resolution of, for example, seconds.

In an embodiment a time window of appropriate length 51, 53 may be provided to determine which transmissions are connected together. The window compensates for the delay from the transmission over the network interfaces as well as the reaction time for a person to answer or to hang up a transmission. Generally, a time window of 1-2 seconds will be enough to determine that endings of transmissions are from the same connected transmission. In the illustrated example, transmission A-2 and B-2 is considered to be a connected as a two way transmission, that is, a set up call. However, a probability value may be determined based on the time difference between the CallstartA and CallstartB indicating the probability that the transmission belong together in order to get a simple, reliable indication that the transmissions belong together.

Figure 3:
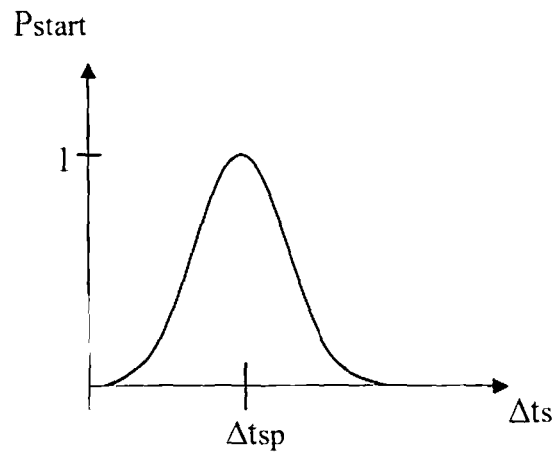
Figure 4:
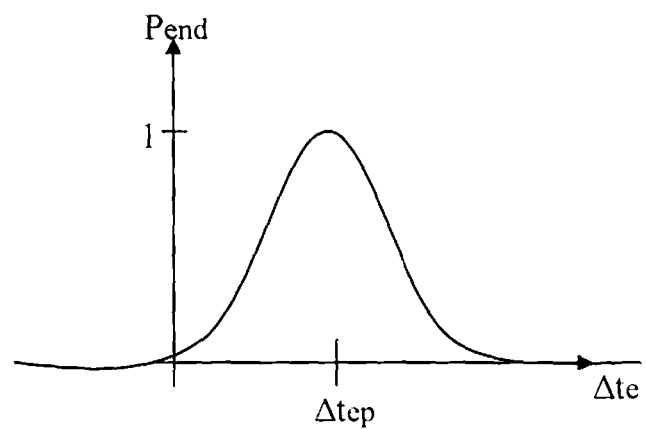
FIG. 4 shows schematically a probability curve of the probability that a second transmission is connected to a first transmission based on a similar end time.

FIG. 3 discloses a schematic curve of a probability that a second transmission is connected to a first transmission based on a difference in start time $\Delta t_s$. The curve may be drawn up by analyzing transmissions to generate a distribution over time of a relationship between a first start message of the first transmission and a second start message of the second transmission. As an example, the curve may reach from a time difference of 0.2 seconds to 5 seconds wherein the difference in time $\Delta t_{sp}$, most probable to indicate a connection between the transmission and hence $P_{start}=1$, is set to 2 seconds. The start messages may, for example in GSM, be ASSIGNMENT COMPLETE, ALERTING or CONNECT messages or any indication a transmission is set up FIG. 4 shows schematically a probability curve of the probability that a second transmission is connected to a first transmission based on difference in end time $\Delta t_e$. The curve may have been generated as the example of the start curve or in any similar manner. As an example of the curve, the curve may reach from a time difference of 0 seconds to 3 seconds wherein the difference in time, $\Delta t_{ep}$, most probable to indicate a connection between the transmission, and hence $P_{end}=1$, is set to 1.0 second. The end messages may be, for example in GSM, DISCONNECT, RELEASE COMPLETE received from the BTS or the CLEAR COMMAND received by the BSC from the MSC or similar.

Figure 5:
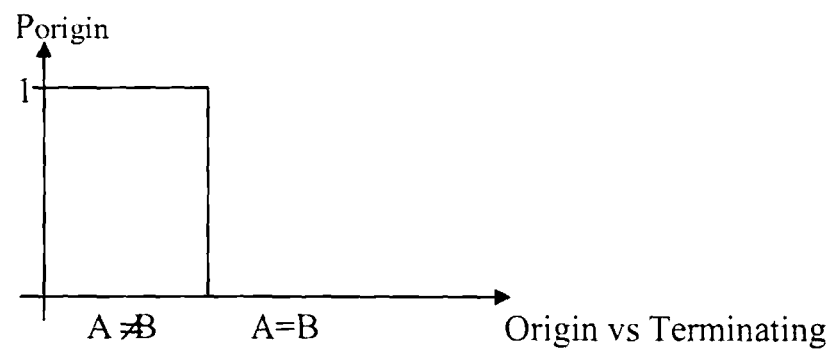
FIG. 5 shows schematically a probability curve of the probability that a second transmission is connected to a first transmission based on if the transmission is an originating or a terminating transmission.

FIG. 5 shows schematically a probability curve of the probability that a second transmission is connected to a first transmission based on if the transmission is an originating or a terminating transmission. As illustrated, the probability Porigin is set to one if the transmissions differ, that is, one transmission being originating and one transmission being terminating A≠B, and set to a non value if the transmissions are the same A=B. In GSM, this information may be retrieved from the PAGING REQUEST or CHANNEL REQUEST messages.

Figure 6:
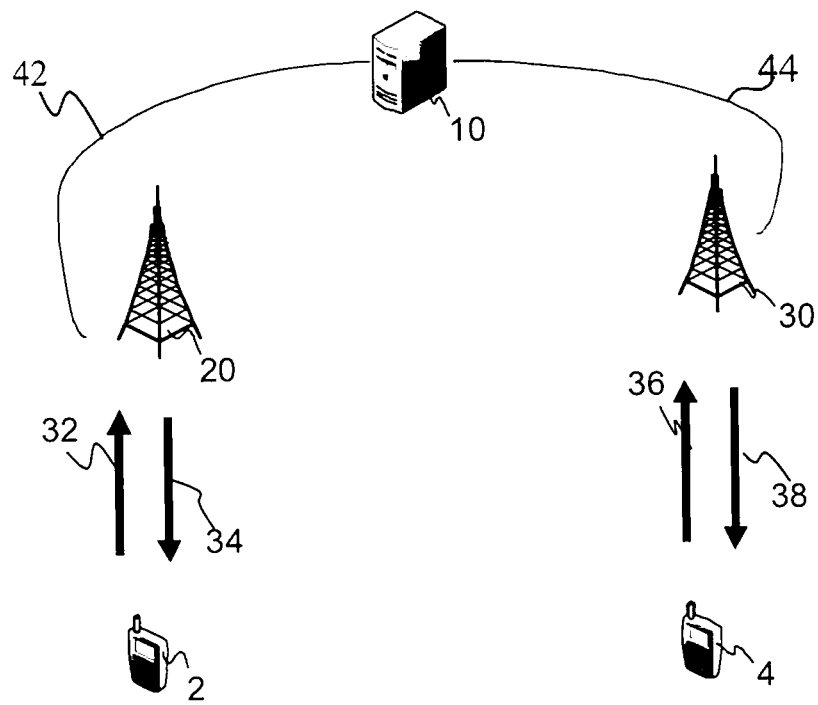
FIG. 6 shows a schematic overview of units in a communications network.

FIG. 6 shows a schematic overview of a base station system. BSS, and user terminals 2, 4, such as mobile stations, wireless phones, PDAs or the like, wherein the BSS comprises a base station control unit 10, such as a BSC or a RNC (Radio Network Controller) or the like, in communication over A-bis interface 42, 44 with base stations 20, 30, such as RBS, Node-B or the like.

The Discontinuous Transmission factor, DTX, is used to avoid sending speech when a user is not speaking. In GSM, the DTX Downlink, DL, is controlled in the transcoder in the BSC. DTX may be enabled very often, for example, every 20 ms. However, the BTS reports with a DTX-DL-flag every SACCH, Slow Associated Control Channel, period (480 ms), if DTX have been used on the downlink during this time. If DTX have been enabled for one speech frame (20 ms) during the SACCH period, the DTX-DL-flag will be 1. If DTX have not been enable during the SACCH period, the DTX flag will be 0. A more accurate measurement of the DTX will be obtained by making the analysis at the base station without sending the reports over SACCH periods.

The determination of the DTX factor will now be explained referring to FIG. 6. A first terminal 2 is connected to a cell of the first base station 20 and has set up a connection to a second terminal 4 that is connected to a cell of the second base station 30 over a base station control unit 10. When a user of the first terminal 2 is talking, that is, transmitting data over the Urn-interface to the base station 20, then the DTX measuring function registers a non value in the uplink 32 and in the down link 38, with a small delay. When a user of the first terminal is not talking, that is, not transmitting data, the DTX will be set to on over the uplink 32 and the down link 38. In a similar manner, the DTX of the down link 34 from the first base station 20 is set to on as long as no transmission is transmitted to the terminal 2 and DTX on the uplink 36 from the second terminal 4 is set to on as long as the terminal 4 is not transmitting data.

It should be noted that noise on the measurements could occur but a correlation factor between the DTX on uplink 32 and DTX on downlink 38 should be able to indicate if the first terminal is connected to the second terminal.

By comparing the DTX of the different links of different transmissions an indication that the transmissions form a two way communication may be obtained. The DTX of an uplink may be the inverse of a downlink to the same terminal and one may also determine uplink 32 to the first base station from a first terminal may to be similar as the downlink 38 to a second terminal from the second base station with a small delay.

Figure 7:
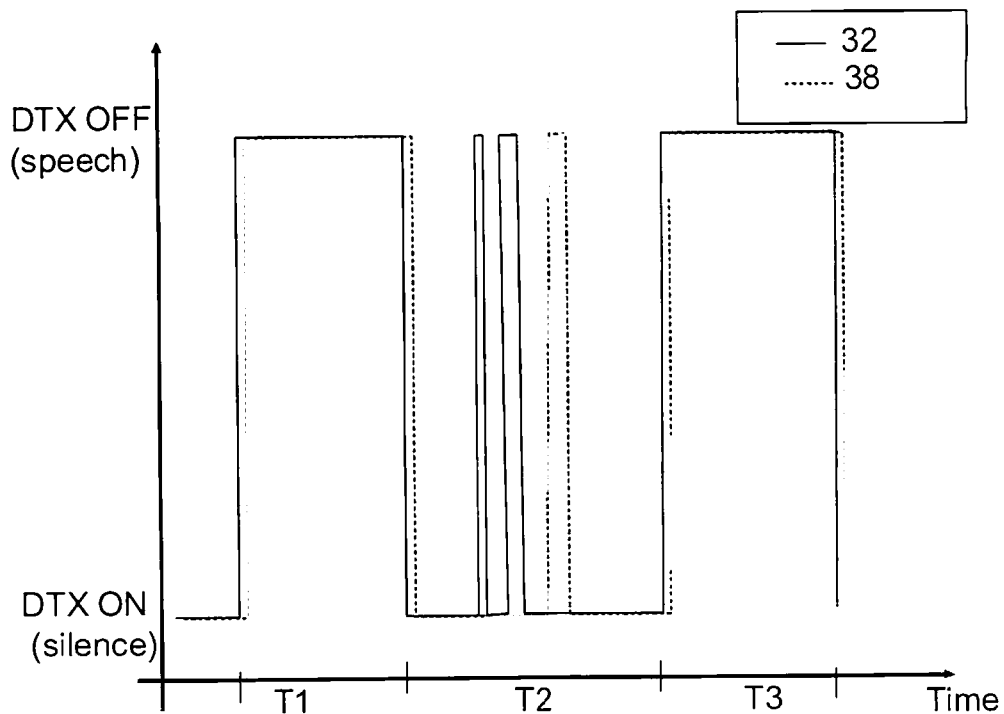
FIG. 7 shows a schematic overview of a Discontinuous Transmission factor, DTX factor, between two users.

In FIG. 7 a schematic overview of a DTX factor between two users is disclosed. The straight line is for the uplink 32 in FIG. 6 from the user terminal 2 to the first base station 20 and the dotted line is for the down link 38 in FIG. 6 from the second base station 30 to the user terminal 4. During time T1 and T3 the first user is talking on the phone which will turn off the DTX for the uplink 32. On the receiving side, the down link 38 to the user terminal 4 DTX is also off. As shown in FIG. 7 the down link may be displaced relative the uplink line showing a small delay due to the transmission way that may or may not be correlated. It should however preferably be considered when comparing transmissions. During T2 the first user is silent and the DTX is on.

Using the DTX comparison of terminals connected to the same site an indication whether terminals are connected locally over the site may be obtained simply and reliably.

Transmission characteristics may be collected by a real time performance monitoring function in GSM or general performance event handler in WCDMA. These characteristics may be retrieved on a per transmission basis. That means, a connection from one user to another user will result in two transmissions in the event statistics.

These characteristics may be used in order to correlate if two transmissions are connected and on what sites these transmissions are connected to. All transmissions over a period of time of a site may be compared to determine a percentage of transmissions being locally connected.

A method of calculating a probability that two transmissions between terminal units and base stations are connected to each other, that is, a transmission between a first and a second terminal has occurred, may be calculated based on the following expression.

$$P_{AB}=\text{Pstart}_{AB}*\text{Pend}_{AB}*PDTX_{AB}*\text{Porigin}_{AB}$$

Where parameters,
 Pstart$_{AB}$ is the probability that the transmissions A and B started at a similar time indicating connected transmissions.
 Pend$_{AB}$ is the probability that the transmissions A and B ended at a similar time indicating connected transmissions.
 PDTX$_{AB}$ is the probability that the DTX factor changed over time for A is the inverse of the DTX factor over time for B, same direction of the link.
 Porigin$_{AB}$ is the probability A is the originating transmission and B is the terminating transmission.

Different combinations of the characteristics probability may be employed to determine $P_{AB}$, for example, if the DTX measurement in the base station is used merely the DTX factor may be enough to indicate that two transmissions belong together. Another example may be to use Pstart, Pend, and Porigin.

In FIG. 8, a matrix of five transmissions M1-M5 with calculated $P_{ABMiMj}$ for each transmission couple is shown. A threshold value for $P_{MiMj}$, for example, 0.1, that has to be exceeded to indicate that transmissions MiMj form a two way transmission is predetermined. In the illustrated example are transmissions M1 and M2, and M3 and M5 considered to be connected as these connected transmissions has calculated probability values 0.28 and 0.32 exceeding threshold value 0.1. Hence, as all five transmissions M1-M5 are transmissions within the same site, it is determined that four out of five transmissions could be locally switched.

In a different embodiment probability is set to 1 whenever a time difference or DTX difference of a parameter is within a predetermined range, resulting in a one or a non value probability value.

An application may be arranged to calculate how much traffic is estimated to be locally on a cell or site level by providing a percentage of the total amount of traffic that is possible to be locally switched.

With the probability that user A is calling B of $P_{AB}$ it is further possible to calculate a weighted Erlangs on this site that are locally switched. The weighted Erlangs may be input for dimensioning and deployment of hardware to support local switching.

Figure 9:
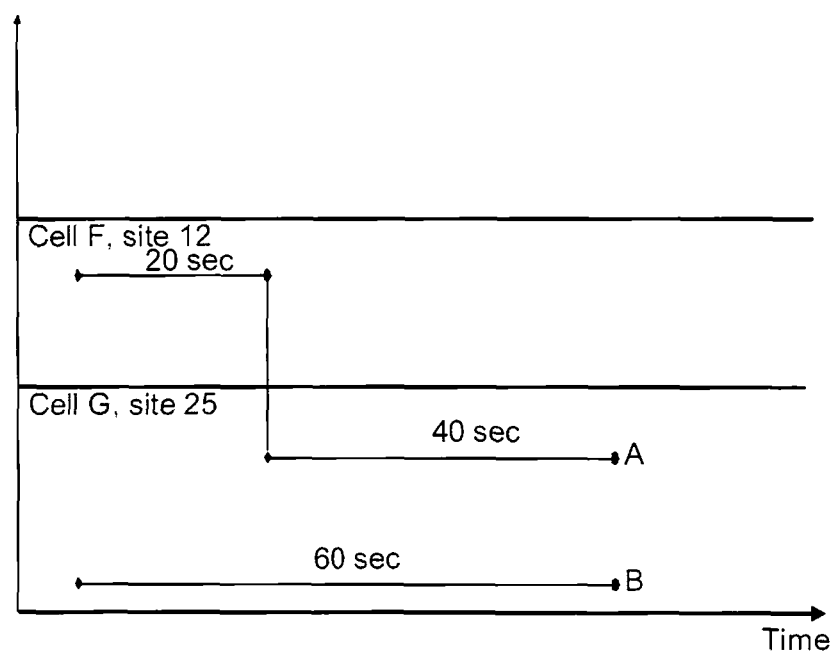
FIG. 9 shows a schematic overview of a two way transmission between to user terminals.

In FIG. 9, a schematic overview of a two way transmission between to user terminals is shown. Initially, the transmissions A B have been determined, by analysing time parameters and DTX factor, to a probability of 0.45 of being connected to each other. Being in different sites from the initiation of the call this process is performed in the base station control unit, such as BSC. Then, a calculation on how many Erlangs these two generate on the same site is performed. Looking at the example in FIG. 9, Call A is served by Cell F for 20 seconds, then a handover is performed to Cell G, and then the Call A is further served by Cell G for 40 seconds. Call B is served by cell G for 60 seconds. So, in this example Call A is generating 40/3600 Erlang that are locally switched in site 25 and Call B is generating 40/3600 Erlang that are locally switched in site 25.

The Erlang may be weighted by adding the probability of the calls being connected 2. In the example it is 2*(40/3600)* 0.45=0.01 Erlang. It should be noted that in an embodiment the Erlang is calculated for all the transmission exceeding a probability threshold value without weighing the Erlang value.

The weighted Erlang may be used for dimensioning purposes and for prioritizing sites during rollout as well as support during sales. As an example, all the weigthed Erlang is summarized into a summarized local switched Erlang and compared to an amount of saved resources transformed into saved costs due to less capacity requirement of the link to the base station controller.

The probability calculation may be performed in a BSC, The Operation and Support Subsystem, OSS, or the like. An application in the OSS could present how much traffic that is estimated to be locally, on a cell or site level. In an embodiment the probability calculation may be performed in the BTS. This solution could be beneficial if only DTX information is known and used in the probability calculation.

Figure 10:
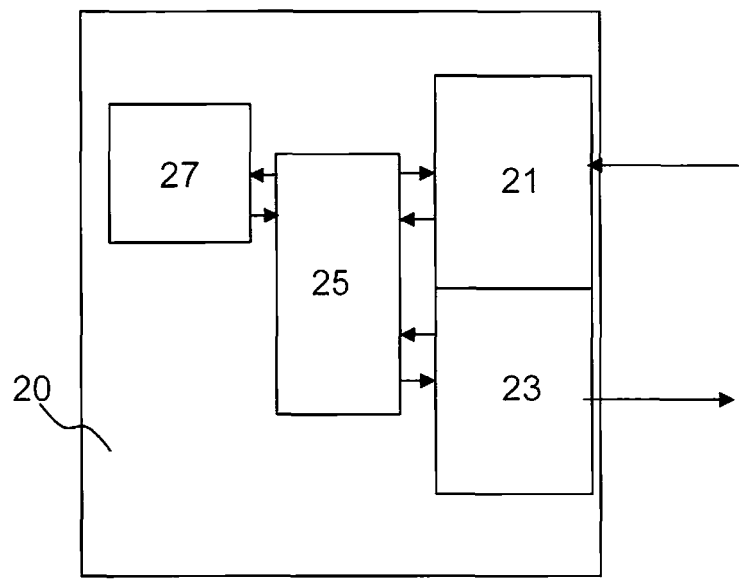
FIG. 10 shows a schematic overview of a base station.

In FIG. 10 a schematic overview of a base station is shown. The base station arrangement 20 comprises a receiving unit 21 adapted to receive a transmission request regarding a first user equipment for an uplink transmission.

The base station arrangement 20 further comprises a sending unit 23 adapted to send the transmission further to a recipient of the transmission.

It should be noted that the sending and receiving unit 21, 23 may be separated units or a combined transceiving arrangement.

Each transmission between terminals and the base station may be logged using a logging application.

The present mechanism for determining the possibility of locally switched transmissions based on the characteristics of transmissions within a site of a communications network may be implemented through one or more processors, such as a processor 25 in the base station arrangement 20 depicted in FIG. 10, together with computer program code stored in a memory 27 for performing the functions of the present solution. The program code mentioned above may also be provided as a computer program product, for instance in the form of a data carrier carrying computer program code for performing the present solution when being loaded into the base station 20. One such carrier may be in the form of a CD ROM disc. It is however feasible with other data carriers such as a memory stick. The computer program code can furthermore be provided as pure program code on a server and downloaded to the base station 20 remotely.

Figure 11:
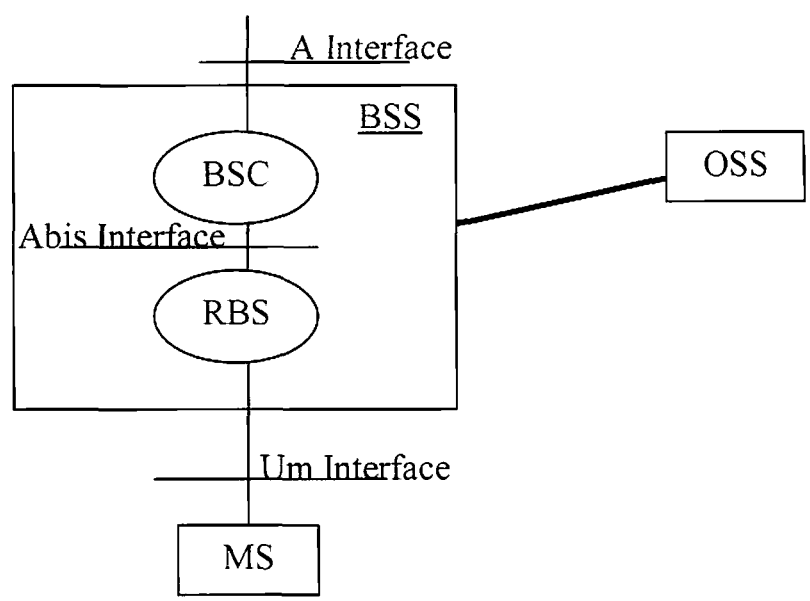
FIG. 11 shows a schematic overview of a devices in a communications network.

In FIG. 11, a schematic overview of a communications network is shown. The communications network comprises a mobile station MS within a base sub system BSS connected over air interface, such as Um interface or the like, to a radio base station RBS that is connected in its turn to the base station controller BSC over A-bis interface. An operation and support subsystem OSS is also disclosed connected to the BSS. The BSC is further uses A-interface to communicate with other devices.

Determining the probability of possible locally switched transmissions based on the characteristics of transmissions may be performed in a RBS, BSC, The Operation and Support Subsystem, OSS, an external computer system or the like.

Determining the DTX factor may be performed in the BSC, the RBS or an external computer.

Figure 12:
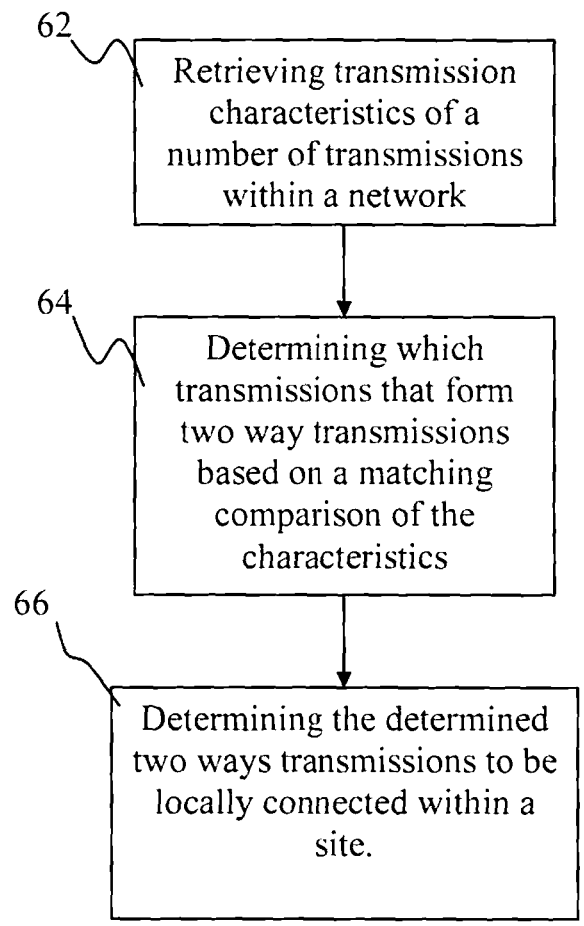
FIG. 12 shows a schematic overview of a flow chart of a method for determining the number of possible occurrences of locally switched transmissions within a site.

In FIG. 12 a flow chart of a method for determining connected transmissions within a site is shown.

In step 62, the method retrieves characteristics data of a first numbers of transmissions in a network. This may be done over a period of time. Characteristics may be Callstart, Call-Origin, Callend and/or DTX factor. In some embodiments, a parameter indicating a cell identity within the transmission performed is also retrieved enabling the determination that local transmissions occur within the same site. In an embodiment, wherein a site comprises a plurality of base stations, a plurality of identities of the base stations or the cells are set to belong to the same site transmission and a possible local switched two way transmission may comprise a transmission in a first cell of a first base station and a second cell of a second base station.

In step 64, the method determines, based on a matching comparison of the characteristics data, if transmissions of the first number of transmissions form a two way transmission.

In step 66, the method may further optionally comprise the step of determining an amount of two way transmissions that are transmissions within the site, so called possible locally switched transmissions. This is performed if the method is performed on transmissions from a plurality of sites. In some embodiments, the method is performed on merely transmissions within a certain site and the determined two way communications are per se performed within the certain site.

This may be performed as an initial step determining which transmission/s of the first number of transmissions being performed within the first site. In some embodiments the second number of transmissions forming two way transmissions is determined before the determination of which transmissions are being performed within the first site.

Optionally may an amount of possible locally switched transmissions relative the total amount of transmissions be calculated and stored in a memory. The amount may be disclosed as a second number of transmissions, Erlang, time or the like. Thus, presenting the result as, for example, Erlang of possible locally switched transmissions in relation to Erlang of the total transmissions or the like.

Figure 13:
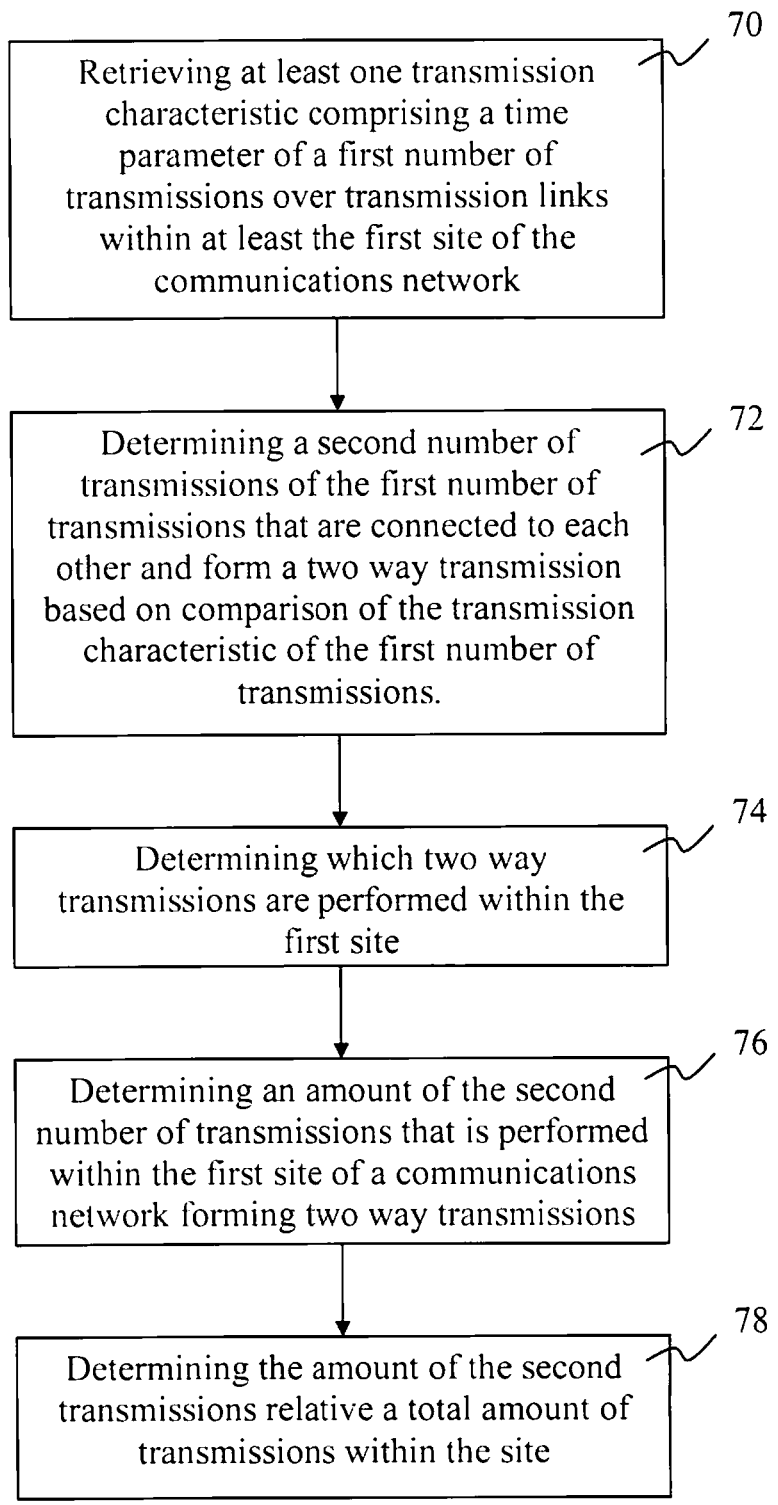
FIG. 13 shows a schematic overview of a flow chart of a method for determining connected transmissions within a site of a communications network.

According to FIG. 13, a method for determining connected transmissions within a first site of a communications network is disclosed.

In step 70, at least one transmission characteristic comprising a time parameter of a first number of transmissions over transmission links within at least the first site of the communications network is retrieved.

In step 72, a second number of transmissions of the first number of transmissions that are connected to each other and form a two way transmission is determined based on comparison of the transmission characteristic of the first number of transmissions.

In some embodiments the first number of transmissions comprises transmissions performed within a plurality of sites and the method may further comprise a step of determining which two way transmissions are performed within the first site as shown in step 74.

In optional step 76, the method may further comprise a step of determining an amount of the second number of transmissions that is performed within the first site of a communications network forming two way transmissions wherein the amount defines a number of transmissions, Erlang of transmission, time of transmission and/or the like.

In optional step 78, the method may further comprise the step of determining the amount of the second number transmissions relative a total amount of transmissions within the site.

In some embodiments the step 76 comprises to sum up Erlang for the two way transmissions.

The sum of Erlang for the two way transmissions may be set in relation to the total Erlang of the site.

The step 74 for determining that the two way communication is within the first site may be performed by identifying transmissions being performed within the site.

The site may comprise at least one cell provided by at least one base station.

In some embodiments, the characteristic comprises a time parameter indicating when its transmission link is occupied over time with a transmission and when it is not occupied over time with a transmission.

In some embodiments, the time parameter comprises a discontinuity transmission factor.

In some embodiments the characteristic comprises a time parameter indicating when a transmission has been initiated over a transmission link.

In some embodiments the characteristic comprises a time parameter indicating when a transmission has been ended.

In some embodiments the characteristic comprises a parameter indicating that a transmission is an originating or a terminating transmission.

A computer program product is disclosed arranged, when being executed on a control unit of a computer system, to perform the method according to the above.

Figure 14:
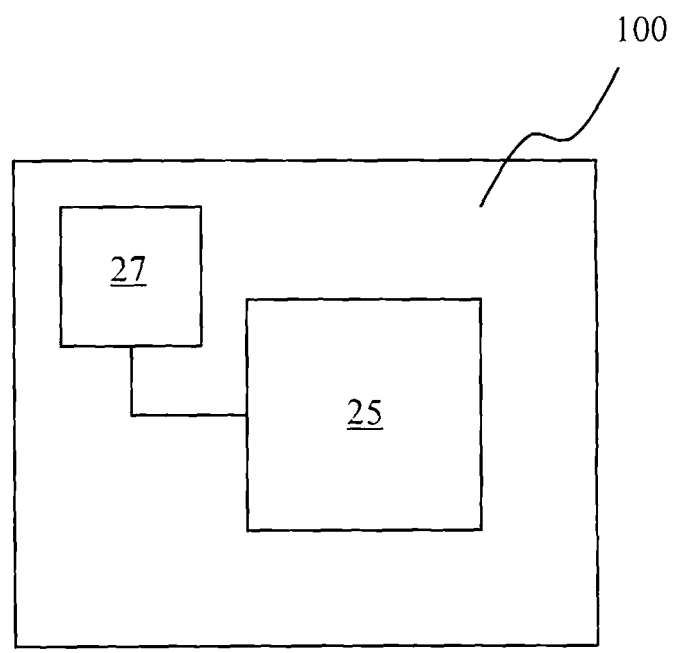
FIG. 14 shows a schematic overview of an electronic device.

In order to perform the method a control unit 25 in an electronic device 100 connected to a memory 27 is provided as shown in FIG. 14. The control unit 25 is arranged to retrieve at least one transmission characteristic comprising a time parameter of a first number of transmissions over transmission links within at least a first site of a communications network, and to determine a second number of transmissions of the first number of transmission that are connected to each other and form two way transmissions based on a comparison of the transmission characteristic of the first number of transmissions.

In some embodiments the transmissions of the first number of transmissions are performed within a plurality of sites of the communications network and the control unit 25 is arranged to determine an amount of the second number of transmissions that is performed within the first site of a communications network forming two way transmissions.

In some embodiments the control unit 25 is arranged to perform a matching comparison process by comparing the at least one characteristic of a first local transmission over a first communications link between a first user terminal and a base station in a communications network and the at least one characteristic of a second transmission over a second communications link between a base station and a second user terminal resulting in a matching indicator, and arranged to determine the second number of transmissions based on the matching indicator.

In some embodiments the characteristic comprises a time parameter indicating when a first communications link between a user terminal and a base station is occupied over time with a transmission and when it is not occupied over time with a transmission.

In some embodiments the time parameter comprises a discontinuity transmission factor.

In some embodiments the characteristic comprises a time parameter indicating when transmission has been initiated over a first communications link.

In some embodiments the characteristic comprises a time parameter indicating when the transmission has ended.

In some embodiments the characteristic comprises a time parameter and a parameter indicating that the transmission is an originating or a terminating transmission.

In some embodiments, the control unit 25 may further be arranged to present an indication of an amount of transmissions being possible to locally switch within the site relative the first number of transmissions using the determined two way transmission as an input.

In some embodiments the control unit 25 may further be arranged to determine the two way transmissions being local within the site based on an identifier of the transmission indicating cell/site/base station.

In some embodiments the control unit 25 may be arranged to retrieve the at least one characteristic from a logging application adapted to logg transmissions.

In some embodiments the electronic device 100 is a base station comprising such a control unit 25.

In some embodiments the base station may further comprise a receiving unit 21 and a sending unit 23 and a logging function arranged to log transmissions using data from receiving unit and transmission unit 23.

In some embodiments the electronic device 100 is a computer unit arranged to operate as a part of an Operator Support System comprising such a control unit.

In some embodiments the electronic device 100 is a computer unit arranged to operate as a part of a controller of at least one base station, comprising such a control unit.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method for determining transmissions that form two way transmissions with other transmissions of the first number of transmissions between respective user equipment nodes within a first site of a communications network comprising:

retrieving at least one transmission characteristic comprising a time parameter for each of a first number of transmissions over transmission links within at least the first site of the communications network, and determining a second number of transmissions of the first number of transmissions that form two way transmissions with other transmissions of the first number of transmissions between respective user equipment nodes, wherein determining comprises comparing at least one transmission characteristic of each transmission to at least one transmission characteristic of other transmissions of the first number of transmissions.

2. A method according to claim 1, wherein the first number of transmissions comprises transmissions performed within a plurality of sites, and wherein determining comprises determining which two way transmissions are performed within the first site.

3. A method according to claim 2, wherein determining that the two way communication is within the first site comprises identifying transmissions being performed within the site.

4. A method according to claim 1, further comprising:
determining an amount of the second number of transmissions that is performed within the first site of a communications network forming two way transmissions wherein the amount defines at least one of a number of transmissions, an Erlang of transmission, and/or a time of transmission.

5. A method according to claim 4, further comprising:
determining the amount of transmissions relative to a total amount of transmissions within the site.

6. A method according to claim 4, wherein determining the amount of the second number of transmissions comprises summing Erlang for the two way transmissions into a sum of Erlang, wherein the sum of Erlang for the two way transmissions is set in relation to the total Erlang of the site.

7. A method according to claim 1, wherein the retrieving comprises retrieving a call start time for each of the first number of transmissions, and wherein the determining comprises correlating a first transmission of the first number of transmissions with a second transmission of the first number of transmission when a respective call start time of the first transmission occurs at a similar time as a respective call start time of the second transmission.

8. A method according to claim 1, wherein the retrieving comprises retrieving a call end time for each of the first number of transmissions, and wherein the determining comprises correlating a first transmission of the first number of transmissions with a second transmission of the first number of transmissions when a respective call end time of the first transmission occurs at a similar time as a respective call end time of the second transmission.

9. A method according to claim 1, wherein the retrieving comprises retrieving a discontinuous transmission factor (DTX) for each of the first number of transmissions, and wherein the determining comprises correlating a first transmission of the first number of transmissions with a second transmission of the first number of transmissions when a respective DTX of the first transmission is substantially inverse of a respective DTX of the second transmission.

10. A method according to claim 1, wherein the determining comprises correlating a first transmission of the first number of transmissions with a second transmission of the first number of transmissions when the first and second transmissions consist of an originating transmission and a terminating transmission.

11. A control unit in an electronic device connected to a memory, wherein the control unit is arranged to retrieve at least one transmission characteristic comprising a time parameter for each of a first number of transmissions over transmission links within at least a first site of a communications network, and to determine a second number of transmissions of the first number of transmissions that form two way transmissions with other transmissions of the first number of transmissions between respective user equipment nodes based on a comparison of at least one transmission characteristic of each transmission to at least one transmission characteristic of other transmissions of the first number of transmissions.

12. A control unit according to claim 11, wherein the transmissions of the first number of transmissions are performed within a plurality of sites of the communications network and the control unit is arranged to determine an amount of the second number of transmissions that is performed within the first site of a communications network forming that form two way transmissions.

13. A control unit according to claim 11, arranged to perform a matching comparison process by comparing the at least one characteristic of a first local transmission over a first communications link between a first user terminal and a base station in a communications network and at least one characteristic of a second transmission over a second communications link between a base station and a second user terminal resulting in a matching indicator, and arranged to determine the second number of transmissions based on the matching indicator.

14. A base station comprising a control unit according to claim 11.

15. A base station according to claim 14, further comprising a receiving unit and a sending unit and a logging function arranged to log transmissions using data from receiving unit and transmission unit.

16. A method of operating a radio network, the method comprising:
providing transmission characteristics for a plurality of transmissions from a site of the radio network to respective user equipment nodes, wherein each of the transmission characteristics for the plurality of transmissions includes a respective time parameter; and
identifying first and second transmissions of the plurality of transmissions from the site supporting two way communication between respective first and second user equipment nodes based on the transmission characteristics including the respective time parameters for the plurality of transmissions.

17. The method of claim 16 wherein each of the time parameters comprises a respective start time for the respective transmission, and wherein identifying the first and second transmissions comprises indentifying the first and second transmissions responsive to the first and second transmissions having respective first and second start times matching within a window.

18. The method of claim 16 wherein each of the time parameters comprises a respective end time for the respective transmission, and wherein indentifying the first and second transmissions comprises indentifying the first and second transmissions responsive to the first and second transmissions having respective first and second end times matching within a window.

19. The method of claim 16 wherein each of the transmission characteristics for the plurality of transmissions further includes a discontinuous transmission factor representing periods of transmission and non-transmission for the respective transmission, and wherein identifying further comprises identifying the first and second transmissions responsive to the first and second transmissions having respective first and second discontinuous transmission factors that are correlated.

20. The method of claim 16 wherein each of the transmission characteristics for the plurality of transmissions further includes one of an originating indicator for an originating transmission or a terminating indicator for a terminating transmission, and wherein identifying further comprises identifying the first and second transmissions responsive to the first transmission having the originating indicator and the second transmission having the terminating indicator.

21. The method of claim 16 wherein identifying the first and second transmissions comprises identifying the first and second transmissions supporting two way communication between the first and second user equipment nodes being locally switched within the site.

22. The method of claim 16 further comprising:
responsive to identifying the first and second transmissions, determining a measure of traffic that is locally switched through the site.

* * * * *

UNITED STATES PATENT AND TRADEMARK OFFICE
CERTIFICATE OF CORRECTION

PATENT NO.        : 8,477,646 B2                          Page 1 of 1
APPLICATION NO.   : 12/936720
DATED             : July 2, 2013
INVENTOR(S)       : Lennartson It is certified that error appears in the above-identified patent and that said Letters Patent is hereby corrected as shown below:

In the Specification

In Column 2, Line 66, delete "devices" and insert -- device --, therefor.

In Column 7, Lines 43-44, delete "urn-interface" and insert -- um-interface --, therefor.

In the Claims

In Column 14, Line 42, in Claim 17, delete "indentifying" and insert -- identifying --, therefor.

In Column 14, Line 43, in Claim 17, delete "indentifying" and insert -- identifying --, therefor.

In Column 14, Line 49, in Claim 18, delete "indentifying" and insert -- identifying --, therefor.

Signed and Sealed this
First Day of April, 2014

Michelle K. Lee
*Deputy Director of the United States Patent and Trademark Office*